United States Patent
Wolfe (10) Patent No.: US 9,056,783 B2
(45) Date of Patent: Jun. 16, 2015

(54) SYSTEM FOR MONITORING DISCHARGES INTO A WASTE WATER COLLECTION SYSTEM

(75) Inventor: Thomas D. Wolfe, Rough and Ready, CA (US)

(73) Assignee: Hach Company, Loveland, CO (US)

( * ) Notice: Subject to any disclaimer, the term of this patent is extended or adjusted under 35 U.S.C. 154(b) by 893 days.

(21) Appl. No.: 11/331,721

(22) Filed: Jan. 13, 2006

(65) Prior Publication Data

US 2007/0163965 A1 Jul. 19, 2007

(51) Int. Cl.
*B01D 35/00* (2006.01)
*C02F 1/00* (2006.01)

(52) U.S. Cl.
CPC ........... *C02F 1/008* (2013.01); *C02F 2209/005* (2013.01); *C02F 2209/008* (2013.01)

(58) Field of Classification Search
CPC ................ C02F 9/00; C02F 2209/008; C02F 2209/006; C02F 1/008; C02F 2209/005
USPC .................. 702/30–32, 81–84, 184; 700/266; 205/742–744
See application file for complete search history.

(56) References Cited

U.S. PATENT DOCUMENTS

| | | | |
|---|---|---|---|
| 4,626,992 A | 12/1986 | Greaves et al. |
| 4,830,757 A | 5/1989 | Lynch et al. |
| 5,227,038 A | 7/1993 | Smalley et al. |
| 5,242,602 A | 9/1993 | Richardson |
| 5,300,203 A | 4/1994 | Smalley |
| 5,315,880 A | 5/1994 | Bailey |
| 5,386,373 A | 1/1995 | Keeler et al. |
| 5,451,314 A | 9/1995 | Neuenschwander |
| 5,465,321 A | 11/1995 | Smyth |
| 5,483,164 A | 1/1996 | Moss et al. |
| 5,492,632 A | 2/1996 | Reber |

(Continued)

FOREIGN PATENT DOCUMENTS

| | | |
|---|---|---|
| CA | 2283502 A1 | 9/1998 |
| EP | 0854839 | 7/1998 |

(Continued)

OTHER PUBLICATIONS

International Search Report and Written Opinion dated Jul. 10, 2012, in Application No. PCT/IB2011/055238.

(Continued)

*Primary Examiner* — Shogo Sasaki
(74) *Attorney, Agent, or Firm* — Miles & Stockbridge P.C.; James T. Carmichael (57) ABSTRACT

A method for monitoring the composition and flow rate of wastes discharged from industrial waste water treatment facilities into a common collection system for eventual processing at central waste water treatment plant (WWTP). The information is transmitted to a remote computer and stored in a database, and is then analyzed to prepare reports of particular interest to the receiving WWTP or treatment facility. The system includes a data collection and sending unit, a remote Internet Server computer with a database capable of receiving and storing the collected information, and a web server and reporting unit to analyze the data, prepare reports, and send out alarms. It is a further intention of this invention to correlate the incoming data from said industrial waste water treatment plants with known flows and compositions at said central WWTP to predict the flow and composition of influx water at the WWTP.

36 Claims, 3 Drawing Sheets

(56) References Cited

U.S. PATENT DOCUMENTS

| | | |
|---|---|---|
| 5,494,573 A | 2/1996 | Schoenmeyer et al. |
| 5,506,791 A | 4/1996 | Hungerford et al. |
| 5,544,531 A | 8/1996 | Heckman |
| 5,553,492 A | 9/1996 | Barrett et al. |
| 5,556,517 A | 9/1996 | Smalley |
| 5,591,312 A | 1/1997 | Smalley |
| 5,608,171 A | 3/1997 | Hunter et al. |
| 5,619,631 A | 4/1997 | Schott |
| 5,631,744 A | 5/1997 | Takeuchi et al. |
| 5,633,809 A | 5/1997 | Wissenbach et al. |
| 5,644,088 A | 7/1997 | Heckman |
| 5,646,863 A | 7/1997 | Morton |
| 5,681,482 A | 10/1997 | Reber |
| 5,691,914 A | 11/1997 | Randolph |
| 5,739,376 A | 4/1998 | Bingel |
| 5,754,451 A | 5/1998 | Williams |
| 5,757,659 A | 5/1998 | Arai et al. |
| 5,811,688 A | 9/1998 | Marsh et al. |
| 5,826,029 A | 10/1998 | Gore et al. |
| 5,832,410 A | 11/1998 | Lin et al. |
| 5,835,724 A | 11/1998 | Smith |
| 5,865,718 A | 2/1999 | Chan |
| 5,867,483 A | 2/1999 | Ennis et al. |
| 5,895,565 A | 4/1999 | Steininger et al. |
| 5,905,570 A | 5/1999 | White et al. |
| 5,960,404 A | 9/1999 | Chaar et al. |
| 5,970,426 A | 10/1999 | Mandel et al. |
| 5,993,662 A | 11/1999 | Garr et al. |
| 5,997,750 A | 12/1999 | Rozelle et al. |
| 6,023,223 A | 2/2000 | Baxter, Jr. |
| 6,061,603 A | 5/2000 | Papadopoulos et al. |
| 6,064,148 A | 5/2000 | Tait et al. |
| 6,097,995 A | 8/2000 | Tipton et al. |
| 6,115,693 A | 9/2000 | McDonough et al. |
| 6,129,901 A | 10/2000 | Moskovits et al. |
| 6,149,775 A | 11/2000 | Tsuboi et al. |
| 6,162,926 A | 12/2000 | Murphy et al. |
| 6,167,376 A | 12/2000 | Ditzik |
| 6,183,714 B1 | 2/2001 | Smalley et al. |
| 6,208,943 B1 | 3/2001 | Randolph et al. |
| 6,222,839 B1 | 4/2001 | Nakazaki et al. |
| 6,265,466 B1 | 7/2001 | Glatkowski et al. |
| 6,305,944 B1 | 10/2001 | Henry et al. |
| 6,317,639 B1 | 11/2001 | Hansen |
| 6,332,110 B1 | 12/2001 | Wolfe |
| 6,346,023 B1 | 2/2002 | Tsuboi et al. |
| 6,356,205 B1 | 3/2002 | Salvo et al. |
| 6,359,444 B1 | 3/2002 | Grimes |
| 6,370,448 B1 | 4/2002 | Eryurek |
| 6,389,331 B1 | 5/2002 | Jensen et al. |
| 6,399,785 B1 | 6/2002 | Murphy et al. |
| 6,401,526 B1 | 6/2002 | Dal et al. |
| 6,448,412 B1 | 9/2002 | Murphy et al. |
| 6,463,352 B1 | 10/2002 | Tadokoro et al. |
| 6,493,208 B1 | 12/2002 | Piche et al. |
| 6,509,619 B1 | 1/2003 | Kendall et al. |
| 6,530,160 B1 | 3/2003 | Gookins |
| 6,538,153 B1 | 3/2003 | Hirsch et al. |
| 6,560,543 B2 | 5/2003 | Wolfe et al. |
| 6,577,988 B1 | 6/2003 | Travagline et al. |
| 6,606,566 B1 | 8/2003 | Sunshine |
| 6,618,709 B1 | 9/2003 | Sneeringer |
| 6,645,455 B2 | 11/2003 | Margrave et al. |
| 6,659,861 B1 | 12/2003 | Faris et al. |
| 6,672,077 B1 | 1/2004 | Bradley et al. |
| 6,673,314 B1 | 1/2004 | Burbank et al. |
| 6,675,127 B2 | 1/2004 | LeBlanc et al. |
| 6,683,783 B1 | 1/2004 | Smalley et al. |
| 6,692,717 B1 | 2/2004 | Smalley et al. |
| 6,712,864 B2 | 3/2004 | Horiuchi et al. |
| 6,725,250 B1 | 4/2004 | Ellis, III |
| 6,743,408 B2 | 6/2004 | Lieber et al. |
| 6,748,748 B2 | 6/2004 | Bradley et al. |
| 6,749,827 B2 | 6/2004 | Smalley et al. |
| 6,752,977 B2 | 6/2004 | Smalley et al. |
| 6,756,025 B2 | 6/2004 | Colbert et al. |
| 6,756,026 B2 | 6/2004 | Colbert et al. |
| 6,762,237 B2 | 7/2004 | Glatkowski et al. |
| 6,790,425 B1 | 9/2004 | Smalley et al. |
| 6,811,457 B2 | 11/2004 | Cheng et al. |
| 6,824,755 B2 | 11/2004 | Colbert et al. |
| 6,827,918 B2 | 12/2004 | Margrave et al. |
| 6,830,679 B2 | 12/2004 | Tsuihiji et al. |
| 6,836,737 B2 | 12/2004 | Petite et al. |
| 6,845,336 B2 | 1/2005 | Kodukkula et al. |
| 6,847,739 B2 | 1/2005 | Jostschulte |
| 6,852,410 B2 | 2/2005 | Veedu et al. |
| 6,858,197 B1 | 2/2005 | Delzeit |
| 6,863,942 B2 | 3/2005 | Ren et al. |
| 6,872,330 B2 | 3/2005 | Mack et al. |
| 6,875,412 B2 | 4/2005 | Margrave et al. |
| 6,885,309 B1 | 4/2005 | Van Heteren |
| 6,890,506 B1 | 5/2005 | Harutyunyan et al. |
| 6,899,945 B2 | 5/2005 | Smalley et al. |
| 6,900,264 B2 | 5/2005 | Kumar et al. |
| 6,904,054 B1 | 6/2005 | Baum et al. |
| 6,913,789 B2 | 7/2005 | Smalley et al. |
| 6,921,575 B2 | 7/2005 | Horiuchi et al. |
| 6,936,233 B2 | 8/2005 | Smalley et al. |
| 6,936,653 B2 | 8/2005 | McElrath et al. |
| 6,939,525 B2 | 9/2005 | Colbert et al. |
| 6,947,427 B1 | 9/2005 | Rokugo et al. |
| 6,949,237 B2 | 9/2005 | Smalley et al. |
| 6,954,701 B2 | 10/2005 | Wolfe |
| 6,961,641 B1 | 11/2005 | Forth et al. |
| 6,969,504 B2 | 11/2005 | Smalley et al. |
| 6,978,212 B1 | 12/2005 | Sunshine |
| 6,979,709 B2 | 12/2005 | Smalley et al. |
| 6,986,853 B2 | 1/2006 | Glatkowski et al. |
| 6,988,925 B2 | 1/2006 | Arthur et al. |
| 7,008,563 B2 | 3/2006 | Smalley et al. |
| 7,008,604 B2 | 3/2006 | Smalley et al. |
| 7,014,737 B2 | 3/2006 | Harutyunyan et al. |
| 7,029,646 B2 | 4/2006 | Margrave et al. |
| 7,036,324 B2 | 5/2006 | Bradley et al. |
| 7,041,620 B2 | 5/2006 | Smalley et al. |
| 7,048,999 B2 | 5/2006 | Smalley et al. |
| 7,049,353 B2 | 5/2006 | Conroy et al. |
| 7,052,666 B2 | 5/2006 | Colbert et al. |
| 7,052,668 B2 | 5/2006 | Smalley et al. |
| 7,058,154 B1 | 6/2006 | Stark et al. |
| 7,060,241 B2 | 6/2006 | Glatkowski |
| 7,061,749 B2 | 6/2006 | Liu et al. |
| 7,067,098 B2 | 6/2006 | Colbert et al. |
| 7,070,651 B1 | 7/2006 | Tolt et al. |
| 7,070,754 B2 | 7/2006 | Smalley et al. |
| 7,070,810 B2 | 7/2006 | Hirsch et al. |
| 7,074,310 B2 | 7/2006 | Smalley et al. |
| 7,076,871 B2 | 7/2006 | Horiuchi et al. |
| 7,085,938 B1 | 8/2006 | Pozzuoli et al. |
| 7,087,207 B2 | 8/2006 | Smalley et al. |
| 7,090,819 B2 | 8/2006 | Smalley et al. |
| 7,094,679 B1 | 8/2006 | Li et al. |
| 7,108,841 B2 | 9/2006 | Smalley et al. |
| 7,118,693 B2 | 10/2006 | Glatkowski et al. |
| 7,121,158 B2 | 10/2006 | Scott et al. |
| 7,176,877 B2 | 2/2007 | Tikhonski et al. |
| 7,179,561 B2 | 2/2007 | Niu et al. |
| 7,182,914 B2 | 2/2007 | Lai et al. |
| 7,189,314 B1 | 3/2007 | Pace et al. |
| 7,189,430 B2 | 3/2007 | Ajayan et al. |
| 7,195,754 B1 | 3/2007 | Glatkowski et al. |
| 7,204,970 B2 | 4/2007 | Smalley et al. |
| 7,217,650 B1 | 5/2007 | Ng et al. |
| 7,227,140 B2 | 6/2007 | Skidmore et al. |
| 7,250,148 B2 | 7/2007 | Yang et al. |
| 7,276,266 B1 | 10/2007 | Khare et al. |
| 7,282,191 B1 | 10/2007 | Choi et al. |
| 7,285,198 B2 | 10/2007 | Douglas |
| 7,303,875 B1 | 12/2007 | Bock et al. |
| 7,338,648 B2 | 3/2008 | Harutyunyan et al. |
| 7,338,915 B1 | 3/2008 | Smalley et al. |
| 7,342,479 B2 | 3/2008 | Glatkowski et al. |
| 7,342,506 B2 | 3/2008 | Paoli et al. |

(56) References Cited

U.S. PATENT DOCUMENTS

| | | |
|---|---|---|
| 7,345,307 B2 | 3/2008 | Pan et al. |
| 7,354,563 B2 | 4/2008 | Smalley et al. |
| 7,357,906 B2 | 4/2008 | Colbert et al. |
| 7,357,983 B2 | 4/2008 | Pfefferle et al. |
| 7,365,395 B2 | 4/2008 | Stumbo et al. |
| 7,378,040 B2 | 5/2008 | Luo et al. |
| 7,390,477 B2 | 6/2008 | Smalley et al. |
| 7,390,767 B2 | 6/2008 | Smalley et al. |
| 7,426,848 B1 | 9/2008 | Li et al. |
| 7,428,046 B2 | 9/2008 | Wang et al. |
| 7,452,735 B2 | 11/2008 | Li et al. |
| 7,454,295 B2 | 11/2008 | Wolfe |
| 7,465,494 B2 | 12/2008 | Ren et al. |
| 7,466,533 B2 | 12/2008 | Chow et al. |
| 7,468,315 B2 | 12/2008 | Buretea et al. |
| 7,470,620 B2 | 12/2008 | Dubin et al. |
| 7,473,411 B2 | 1/2009 | Ajayan et al. |
| 7,473,436 B1 | 1/2009 | Khare et al. |
| 7,479,240 B2 | 1/2009 | Jhi et al. |
| 7,514,369 B2 | 4/2009 | Li et al. |
| 7,515,333 B1 | 4/2009 | Empedocies |
| 7,522,040 B2 | 4/2009 | Passmore et al. |
| 7,553,371 B2 | 6/2009 | Dubrow et al. |
| 7,553,471 B2 | 6/2009 | Ohashi et al. |
| 7,557,028 B1 | 7/2009 | Scher et al. |
| 7,560,134 B2 | 7/2009 | Yaniv et al. |
| 7,560,136 B2 | 7/2009 | Ward et al. |
| 7,560,366 B1 | 7/2009 | Romano et al. |
| 7,563,722 B2 | 7/2009 | Yaniv et al. |
| 7,566,945 B2 | 7/2009 | Choi et al. |
| 7,569,503 B2 | 8/2009 | Pan et al. |
| 7,575,720 B2 | 8/2009 | Novak et al. |
| 7,575,933 B2 | 8/2009 | Gabriel et al. |
| 7,581,645 B2 | 9/2009 | Ho et al. |
| 7,595,528 B2 | 9/2009 | Duan et al. |
| 7,596,415 B2 | 9/2009 | Brabec et al. |
| 7,597,788 B2 | 10/2009 | Visel et al. |
| 7,611,740 B2 | 11/2009 | Jiang et al. |
| 7,611,906 B2 | 11/2009 | Yaniv |
| 7,623,972 B1 | 11/2009 | Li et al. |
| 7,628,974 B2 | 12/2009 | Grill et al. |
| 7,630,227 B2 | 12/2009 | Tran |
| 7,632,548 B2 | 12/2009 | Yaniv |
| 7,635,503 B2 | 12/2009 | Dominguez et al. |
| 7,641,938 B2 | 1/2010 | Liu et al. |
| 7,645,397 B2 | 1/2010 | Parce et al. |
| 7,647,813 B2 | 1/2010 | Pavlovsky |
| 7,651,769 B2 | 1/2010 | Dubrow |
| 7,651,944 B2 | 1/2010 | Duan et al. |
| 7,652,418 B2 | 1/2010 | Choi et al. |
| 7,655,497 B1 | 2/2010 | Yu et al. |
| 7,667,296 B2 | 2/2010 | Stumbo et al. |
| 7,687,981 B2 | 3/2010 | Parsapour |
| 7,691,720 B2 | 4/2010 | Furukawa et al. |
| 7,695,609 B2 | 4/2010 | Soundarrajan et al. |
| 7,696,272 B2 | 4/2010 | Li et al. |
| 7,698,073 B2 * | 4/2010 | Wolfe .......................... 702/22 |
| 7,701,014 B2 | 4/2010 | Mostarshed et al. |
| 7,701,428 B2 | 4/2010 | Stumbo et al. |
| 7,704,479 B2 | 4/2010 | Rinzler et al. |
| 7,704,547 B1 | 4/2010 | Delzeit et al. |
| 7,714,386 B2 | 5/2010 | Pesetski et al. |
| 7,714,398 B2 | 5/2010 | Ben-Barak et al. |
| 7,728,520 B2 | 6/2010 | Yaniv et al. |
| 7,736,209 B2 | 6/2010 | Mao et al. |
| 7,736,979 B2 | 6/2010 | Farrow et al. |
| 7,741,197 B1 | 6/2010 | Duan et al. |
| 7,745,498 B2 | 6/2010 | Pereira et al. |
| 7,749,477 B2 | 7/2010 | Jiang et al. |
| 7,750,235 B2 | 7/2010 | Scher et al. |
| 7,754,524 B2 | 7/2010 | Dubrow et al. |
| 7,755,038 B2 | 7/2010 | Niu et al. |
| 7,755,115 B2 | 7/2010 | Awano |
| 7,762,121 B2 | 7/2010 | Ng et al. |
| 7,767,067 B2 | 8/2010 | Silveri |
| 7,767,102 B2 | 8/2010 | Lemmi et al. |
| 7,767,270 B1 | 8/2010 | Khare et al. |
| 7,776,758 B2 | 8/2010 | Duan et al. |
| 7,776,760 B2 | 8/2010 | Taylor |
| 7,782,462 B2 | 8/2010 | Pavlovsky |
| 7,784,531 B1 | 8/2010 | Li et al. |
| 7,785,922 B2 | 8/2010 | Robbins |
| 7,786,024 B2 | 8/2010 | Stumbo et al. |
| 7,786,402 B2 | 8/2010 | Fink et al. |
| 7,791,258 B2 | 9/2010 | Yaniv et al. |
| 7,794,600 B1 | 9/2010 | Buretea et al. |
| 7,795,125 B2 | 9/2010 | Buretea et al. |
| 7,801,687 B1 | 9/2010 | Li et al. |
| 8,504,305 B2 | 8/2013 | Wolfe |
| 8,577,623 B2 | 11/2013 | Wolfe |
| 2001/0020195 A1 | 9/2001 | Patel et al. |
| 2001/0053992 A1 | 12/2001 | Eto et al. |
| 2001/0055978 A1 | 12/2001 | Herrod et al. |
| 2002/0023479 A1 | 2/2002 | Burge et al. |
| 2002/0130069 A1 | 9/2002 | Moskoff |
| 2002/0133270 A1 | 9/2002 | Hung et al. |
| 2002/0183971 A1 | 12/2002 | Wegerich et al. |
| 2003/0052585 A1 | 3/2003 | Guillorn et al. |
| 2003/0089899 A1 | 5/2003 | Lieber et al. |
| 2003/0124717 A1 | 7/2003 | Awano et al. |
| 2003/0174070 A1 | 9/2003 | Garrod et al. |
| 2003/0207326 A1 | 11/2003 | Su et al. |
| 2004/0026684 A1 | 2/2004 | Empedocles |
| 2004/0066313 A1 | 4/2004 | Ong et al. |
| 2004/0117731 A1 | 6/2004 | Blyashov |
| 2004/0132070 A1 | 7/2004 | Star et al. |
| 2004/0136866 A1 | 7/2004 | Pontis et al. |
| 2004/0245209 A1 | 12/2004 | Jung et al. |
| 2005/0046017 A1 | 3/2005 | Dangelo |
| 2005/0136483 A1 | 6/2005 | Carlson |
| 2005/0186333 A1 | 8/2005 | Douglas |
| 2005/0221473 A1 | 10/2005 | Dubin et al. |
| 2005/0224220 A1 | 10/2005 | Li et al. |
| 2005/0269285 A1 | 12/2005 | Jung et al. |
| 2005/0273424 A1 | 12/2005 | Silverman et al. |
| 2006/0014155 A1 | 1/2006 | Hamers et al. |
| 2006/0078468 A1 | 4/2006 | Gabriel et al. |
| 2006/0112983 A1 | 6/2006 | Parce et al. |
| 2006/0124028 A1 | 6/2006 | Huang et al. |
| 2006/0240218 A1 | 10/2006 | Parce |
| 2006/0257637 A1 | 11/2006 | Pereira et al. |
| 2006/0275914 A1 | 12/2006 | Henley et al. |
| 2006/0287906 A1 | 12/2006 | McGillin |
| 2007/0044295 A1 | 3/2007 | Chen |
| 2007/0045128 A1 | 3/2007 | Krathefer et al. |
| 2007/0132043 A1 | 6/2007 | Bradley et al. |
| 2007/0140930 A1 | 6/2007 | Novak et al. |
| 2007/0155064 A1 | 7/2007 | Chen et al. |
| 2007/0163965 A1 | 7/2007 | Wolfe |
| 2007/0238209 A1 | 10/2007 | Yaniv et al. |
| 2007/0246364 A1 | 10/2007 | Amlani et al. |
| 2008/0035481 A1 | 2/2008 | McCormack et al. |
| 2008/0142361 A1 | 6/2008 | Han et al. |
| 2008/0150009 A1 | 6/2008 | Chen |
| 2008/0152839 A1 | 6/2008 | Han et al. |
| 2008/0221806 A1 | 9/2008 | Bryant et al. |
| 2008/0237540 A1 | 10/2008 | Dubrow |
| 2008/0246076 A1 | 10/2008 | Chen |
| 2008/0280069 A1 | 11/2008 | Parce et al. |
| 2008/0280780 A1 | 11/2008 | Hamers et al. |
| 2009/0035570 A1 | 2/2009 | Mao et al. |
| 2009/0045061 A1 | 2/2009 | Farrow et al. |
| 2009/0058431 A1 | 3/2009 | Dass et al. |
| 2009/0072192 A1 | 3/2009 | Seal et al. |
| 2009/0095704 A1 | 4/2009 | Mao et al. |
| 2009/0123343 A1 | 5/2009 | Kwiatkowski |
| 2009/0124025 A1 | 5/2009 | Hamilton et al. |
| 2009/0138240 A1 * | 5/2009 | Wolfe .......................... 702/188 |
| 2009/0192429 A1 | 7/2009 | Daniels et al. |
| 2009/0198117 A1 | 8/2009 | Cooper et al. |
| 2009/0230380 A1 | 9/2009 | Leon et al. |
| 2009/0242429 A1 | 10/2009 | Sitdikov et al. |
| 2009/0242854 A1 | 10/2009 | Li et al. |
| 2009/0252886 A1 | 10/2009 | Barker et al. |

(56) References Cited

U.S. PATENT DOCUMENTS

| | | | |
|---|---|---|---|
| 2009/0261186 A1 | 10/2009 | Fink et al. |
| 2009/0274833 A1 | 11/2009 | Li et al. |
| 2009/0278556 A1 | 11/2009 | Man et al. |
| 2009/0286383 A1 | 11/2009 | Jiang et al. |
| 2009/0325370 A1 | 12/2009 | Yang et al. |
| 2010/0000762 A1 | 1/2010 | Yang et al. |
| 2010/0055349 A1 | 3/2010 | Gaitas et al. |
| 2010/0062178 A1 | 3/2010 | Zhang et al. |
| 2010/0068406 A1 | 3/2010 | Man |
| 2010/0072429 A1 | 3/2010 | Rajala et al. |
| 2010/0089122 A1 | 4/2010 | Abdullah et al. |
| 2010/0102245 A1 | 4/2010 | Jiang et al. |
| 2010/0104808 A1 | 4/2010 | Fan et al. |
| 2010/0116666 A1 | 5/2010 | Park et al. |
| 2010/0125412 A1 | 5/2010 | Salzer et al. |
| 2010/0127167 A1 | 5/2010 | Schropp, Jr. et al. |
| 2010/0140213 A1 | 6/2010 | Mizukami et al. |
| 2010/0143234 A1 | 6/2010 | Kajiuyra et al. |
| 2010/0153021 A1 | 6/2010 | Wolfe |
| 2010/0167011 A1 | 7/2010 | Dubrow |
| 2010/0167512 A1 | 7/2010 | Pan et al. |
| 2010/0173228 A1 | 7/2010 | Wallace et al. |
| 2010/0204924 A1* | 8/2010 | Wolfe et al. ..................... 702/25 |
| 2010/0332149 A1* | 12/2010 | Scholpp ........................ 702/25 |
| 2011/0125412 A1 | 5/2011 | Salzer et al. |
| 2012/0125771 A1 | 5/2012 | Salzer et al. |
| 2013/0009781 A1 | 1/2013 | Wolfe |
| 2013/0073611 A1 | 3/2013 | Wolfe |

FOREIGN PATENT DOCUMENTS

| | | |
|---|---|---|
| EP | 1015384 | 7/2000 |
| EP | 1404908 B1 | 11/2007 |
| EP | 1864122 | 12/2007 |
| EP | 1623437131 | 12/2007 |
| EP | 1954387 | 8/2008 |
| EP | 1976431 | 10/2008 |
| EP | 1836104 B1 | 1/2009 |
| EP | 2018549 | 1/2009 |
| EP | 2047531 | 4/2009 |
| EP | 2083928 | 8/2009 |
| EP | 1556878 B1 | 4/2010 |
| JP | 3958792 B2 | 8/2007 |
| JP | 3962376 B2 | 8/2007 |
| JP | 2008/260073 | 10/2008 |
| JP | 4381428 B2 | 12/2009 |
| WO | WO 97/09272 A1 | 3/1997 |
| WO | WO 00/36412 A1 | 6/2000 |
| WO | WO 01/80494 | 10/2001 |
| WO | WO 03/024798 A1 | 3/2003 |
| WO | WO 03/038685 A2 | 5/2003 |
| WO | WO 03/050036 A1 | 6/2003 |
| WO | WO 03/078317 A1 | 9/2003 |
| WO | WO 2004/024407 A1 | 3/2004 |
| WO | WO 2004/052559 A2 | 6/2004 |
| WO | WO 2004/063964 A2 | 7/2004 |
| WO | WO 2004/069737 A2 | 8/2004 |
| WO | WO 2004/097853 A1 | 11/2004 |
| WO | WO 2005/022120 A2 | 3/2005 |
| WO | WO 2005/079202 A2 | 9/2005 |
| WO | WO 2005/086982 A2 | 9/2005 |
| WO | WO 2005/110624 A2 | 11/2005 |
| WO | WO 2006/069458 A1 | 7/2006 |
| WO | WO 2006/073420 A2 | 7/2006 |
| WO | WO 2006/078286 A2 | 7/2006 |
| WO | WO 2006/102064 A2 | 9/2006 |
| WO | WO 2007/024697 A2 | 3/2007 |
| WO | WO 2007/067922 A2 | 6/2007 |
| WO | WO 2007/106836 A2 | 9/2007 |
| WO | WO 2007/124612 A2 | 11/2007 |
| WO | WO 2008/051205 A2 | 5/2008 |
| WO | WO 2008/057615 A2 | 5/2008 |
| WO | WO 2008/060455 A3 | 5/2008 |
| WO | WO 2008/076473 A2 | 6/2008 |
| WO | WO 2008/091402 A2 | 7/2008 |
| WO | WO 2008/143714 A2 | 11/2008 |
| WO | WO 2008/150336 A2 | 12/2008 |
| WO | WO 2009/011450 A1 | 1/2009 |
| WO | WO 2009/023061 A2 | 2/2009 |
| WO | WO 2009/042079 A2 | 4/2009 |
| WO | WO 2009/106426 A9 | 10/2009 |
| WO | WO 2010/003212 A1 | 1/2010 |
| WO | WO 2010/048405 A1 | 4/2010 |
| WO | WO 2010/048407 A1 | 4/2010 |
| WO | WO 2010/056826 A1 | 5/2010 |
| WO | WO 2010/077226 A1 | 7/2010 |
| WO | WO 2010/093703 A1 | 8/2010 |
| WO | WO 2010/096035 A1 | 8/2010 |
| WO | WO 2012/069993 A2 | 5/2012 |
| WO | WO 2012/069992 A2 | 9/2012 |

OTHER PUBLICATIONS

International Search Report and Written Opinion dated Aug. 30, 2012, in Application No. PCT/IB2011/055240.

Ardakan, Mohammad Mazloum et al.,: "Novel Coated-Wire Membrane Sensor Based on Bis(Acetylacetonato) Cadmium(II) for the Determination of Chromate Ions"; Department of Chemistry, Faculty of Science, Kashan University, Kashan, Iran; received Jul. 24, 2004; accepted Nov. 16, 2004; published online Mar. 21, 2005 © Springer-Verlag 2005.

Schuler, R. et al., Modified gas-permeable silicone rubber membranes for covalent immobilization of enzymes and their use in biosensor development ICB, Institut fur Chemo- und Biosensorik, eV, Mendelstrasse 7, D-48149 Munster, Germany, received Apr. 13, 1999, accepted Jun. 18, 1999.

Faridbod, Farmoush et al., "The fabrication of potentiometric membrane sensors and their applications"; Tehran, P.O. Box 14155-6451, Iran, accepted Nov. 12, 2007; African Journal of Biotechnology vol. 6 (25), pp. 2960-2987, Dec. 28, 2007. Available online at http://www.academicjournals.org/AJ; ISSN 1684-5315 © 2007 Academic Journals.

Zbignlew, Moron, "Considerations on the Accuracy of Measurements of Electrical Conductivity of Liquids" Department of Biomedical Engineering and Instrumentation, Wroclaw University of Technology, Wroclase, Poland, XVIII Imeko World Congress Metrology for a Sustainable Development, Sep. 17-22, 2006, Rio de Janeiro, Brazil.

Heng, Lee Yook et al., "Producing "Self-Plasticizing" Ion-Selective Membranes", Institute of Biotechnology, University of Cambridge, Tennis Court Road, Cambridge CB2 1QT, U.K. Anal. Chem. 2000, 72, 42-51.

Pretsch, Emo et al., "Design features of ionophores for ion selective electrodes", Department of Organic Chemistry, Swiss Federal Institute of Technology (ETH), Universitatstrasse 16, CH-8092 Zurich, Switzerland, Pure & Appl. Chem., vol. 60, No. 4, pp. 567-574, 1988, printed in Great Britain © 1998 IUPAC.

Cycliax, Ingo, "Remote Internet Data Logging and Sensing", Circuit Cellar Magazine, Embedded PC, PC/104 Quarter104, Nov. 1997, pp. 53-59.

McKinnon, et al., "Automating Communications with and Developing User Interfaces for Remote data Acquisition and Analysis Systems", IEEE Transactions on Nuclear Science, vol. 44, No. 3, Jun. 1997, pp. 1062-1064.

Franklin, et al., "Data in Your Face": Push Technology in Perspective, S., SIGMOD Record, vol. 27, Issue 2, Jun. 1998, pp. 516-519.

Soreide, et al., "Mosaic Access to Realtime Data from the TOGA-TAO array of moored buoys", accessed from web site Equatorial Pacific, Oct. 16, 2002, pp. 1-8.

Northwest Fisheries Science Center, National Marine Fisheries Service (NOAA), "Water Recirculation Project", accessed from web site NWFSC:Aquaculture-Water Recirculation Project, Oct. 16, 2002, pp. 1-3.

Northwest Fisheries Science Center, "NWFCS Water Recirculation Project: Data Acquisition and Web Display", accessed from web site NWFSC Web Template, Oct. 16, 2002, pp. 1-3.

(56) References Cited

OTHER PUBLICATIONS

Scott, et al., "A Computer Automated Cold Water Recirculating System for Aquaculture Research", accessed from web U.S. Dept. Commerce/NOAA/NMFS/NWFSC, Oct. 16, 2002, pp. 1-9.
Remote Measurement Systems, "Case Studies", accessed from web site Remote Measurement Systems—Case Studies: Fisheries, Oct. 16, 2002, pp. 1-4.
Remote Measurement Systems, "Posting Real-Time Measurement to the Web", Home Energy, accessed from web site Posting Real-Time Measurements to Web Pages, Oct. 16, 2002, pp. 1-5.
Liu et al., Carbon Nanotube in Biology and Medicine: In vitro and in vivo Detection, Imaging and Drug Delivery; Nano Res., Vole 2, pp. 85-120 (2009).
Buhrer, Thomas, "Neutral-Carrier-Based Ion-Selective Microelectrodes Design and Application, A Review", Department of Organic Chemistry, Swiss Federal Institute of Technology, Zurich, Switzerland, Analytical Sciences, Dec. 1988, vol. 4, pp. 547-557.
Tzeng et al., "Hydration Properties of Carbon Nanotubes and Their Effects on Electrical and Biosensor Applications", New Diamond and Frontier Carbon Technology, vol. 14, No. 3, 2004, pp. 193-201.
Lumb Alan M. et al., "Users Manual for an Expert System (HSPEXP) for Calibration of the Hydrological Simulation Program—Fortran", U.S. Geological Survey, Water-Resources Investigations Report 94-4168, 1994, 106 pages.
Johnston et al., "Management, Operation and Maintenance of Irrigation and Drainage Systems", Second Edition, ASCE Manuals and Reports on Engineering Practice No. 57, American Society of Civil Engineers, 1991, 13 pages.
Nonfinal Office Action dated Jan. 31, 2013, in U.S. Appl. No. 13/619,880.
Nonfinal Office Action dated Mar. 4, 2013, in U.S. Appl. No. 13/619,775.
Nonfinal Office Action dated Mar. 5, 2013, in U.S. Appl. No. 13/620,000.
International Preliminary Report on Patentability dated Jun. 6, 2013, in PCT/IB2011/055240.
International Preliminary Report on Patentability dated Jun. 6, 2013, in PCT/IB2011/055238.
Final Rejection dated Jul. 19, 2013, in U.S. Appl. No. 13/619,880.
Notice of Allowance dated Aug. 7, 2013, in U.S. Appl. No. 13/619,775.
Nonfinal Office Action dated Sep. 12, 2013, in U.S. Appl. No. 12/565,091.
Final Rejection dated Sep. 13, 2013, in U.S. Appl. No. 12/952,566.
Final Rejection dated Sep. 26, 2013, in U.S. Appl. No. 12/952,392.
Nonfinal Office Action dated Nov. 19, 2013, in U.S. Appl. No. 13/619,880.
Supplementary European Search Report dated Jan. 21, 2012, in European Patent Application No. EP 03 81 5260.
French Search Report dated May 29, 2013, in French Patent Application No. 11 60667, 6 pages.
Nonfinal Office Action dated Jan. 16, 2014, in U.S. Appl. No. 13/620,000.
Nonfinal Office Action dated Jul. 30, 2014, in U.S. Appl. No. 13/620,000.
Final Rejection dated May 6, 2014, in U.S. Appl. No. 12/565,091.
Final Rejection dated May 15, 2014, in U.S. Appl. No. 13/619,880.
Nonfinal Office Action dated Jun. 3, 2014, in U.S. Appl. No. 14/062,976.
Notice of Allowance dated Sep. 11, 2014, in U.S. Appl. No. 14/062,976.
Notice of Allowance dated Oct. 3, 2014, in U.S. Appl. No. 12/565,091.
European Office Action dated Sep. 30, 2014, in European Application No. 03 815 260.9-1559.
Canadian Office Action dated May 17, 2012, in Canadian Application No. 2,512,643.
Bohme, Thomas J. et al., "Comparison of Autoassociative Neural Networks and Kohonen Maps for Signal Failure Detection and Reconstruction", Jan. 1, 1999 XP055050318, Retrieved from the Internet: URL:http//citeseerx.ist.psu.edu/viewdoc/download?doi=10.1.1.39,4334&rep=rep1&type=pdf [retrieved on Jan. 18, 2013].
Lindquist M. et al., "Virtual water quality tests with an electronic tongue", IMTC 2001, Proceedings of the 18th, IEEE I Nstrumentation and Measurement Technology Conference, Budapest, Hungary, May 21-23, 2001; [IEEE Instrumentation and Measurement Technology Conference. (IMTC):] New York, NY: IEEE, US, vol. 2, May 21, 2001, pp. 1320-1324, XP010545970, DOI: 10.1109/IMTC.2001.928288 ISBN: 978-0-7803-6646-6.
Bourgeois W., et al.: "Use of a chemical sensor array for detecting pollutants in domestic wastewater", Water Research, Elsevier, Amsterdam, NL, vol. 36, No. 18, Nov. 1, 2002, pp. 4505-4512, XP004380734, vol. 36, No. 18, Nov. 1, 2002, pp. 4505-4512, XP004380734, ISSN: 0043-1354, DOI: 10.1016/S0043(02)00183-5.

\* cited by examiner

SYSTEM FOR MONITORING DISCHARGES INTO A WASTE WATER COLLECTION SYSTEM

CROSS REFERENCE TO RELATED APPLICATIONS

This application is a continuation-in-part of U.S. patent application Ser. No. 12/272,018 filed Nov. 17, 2008, now U.S. Pat. No. 7,698,073, which is a continuation of U.S. patent application Ser. No. 10/392,112 filed Mar. 19, 2003, now U.S. Pat. No. 7,454,295, which is a continuation-in-part of U.S. patent application Ser. No. 10/055,225 filed Oct. 26, 2001, now U.S. Pat. No. 6,560,543, which is a continuation-in-part of U.S. patent application Ser. No. 09/213,781 filed Dec. 17, 1998, now U.S. Pat. No. 6,332,110, the contents of which are each incorporated herein by reference in their entirety.

FIELD OF THE INVENTION

This invention is related in general to the field of wastewater treatment and wastewater collection systems, and more particularly to a method of remote monitoring, through a global computer network, the quantity, quality, and composition of waste fluids discharged from distributed treatment sites using control systems, instruments, and sensors having integral processing and communication means.

BACKGROUND OF THE INVENTION

The treatment and subsequent recycling of wastewater is a cornerstone of the quality of life in the industrialized world. Cities, industries, and agricultural operations produce large quantities of wastewater, all of which must be treated to some degree or another before the water is suitable for recycling or discharge into streams, rivers or the oceans. In metropolitan areas, central water treatment plants or Waste Water Treatment Plants (WWTP) must treat water from a variety of sources including industrial wastewater. In many metropolitan areas industrial waste water generators are required to install and operate waste water treatment plants at their own sites before discharge into central water collection systems. At the central water collection system, industrial wastes are mixed with domestic wastewater and other untreated waste sources. These mixed wastes are then transported to the central wastewater or sewage treatment facility for final treatment before discharge. In the case of the present invention, it will be readily appreciated by WWTP operators that knowledge of the incoming waste water composition would be of great benefit in assuring the continued operation of the central facility at top efficiency.

Increasingly, the need for pure water is causing more and more municipalities to install wastewater recovery processes to recycle municipal WWTP effluent back suitable as potable drinking water or irrigation quality. The first major application in the U.S. of this sort was the Fountain Valley, Calif. Water Factory which recovers secondary treated municipal effluent using reverse osmosis. Here, as in many other examples, the recovered water is injected back into an aquifer. More and more of these installations are planned throughout the United States and the rest of the world.

One difficult aspect of treating municipal effluent is that neither the flow rates nor the mix of contaminants are constant. This is particularly true for municipal WWTP with collection systems that include a variety of industrial discharge sources in addition to the usual sanitary discharges from homes, businesses, schools, and so on. While the sanitary discharges are well characterized in terms of composition and treatability, the addition of industrial wastes means that the WWTP must plan for a wide variety of contaminants. In general, most WWTP systems cannot deal effectively with every situation. Even with excellent design and engineering, the large fluctuation in the type and quantity of contaminants reaching the WWTP often result in varying levels of effective treatment in the discharge from the WWTP. For a tertiary water recovery plant treating the effluent from the WWTP this can be particularly difficult since many contaminants are not readily removed even by processes such as reverse osmosis. In addition, certain contaminants can also foul reverse osmosis, ultrafiltration, and microfiltration membranes, causing loss of performance or membrane damage.

The instant invention provides a method whereby relevant information about the quantity and composition of industrial waste discharges can be reliably and quickly transmitted to the operators of the central WWTP. This advance notice allows the WWTP to respond to varying contaminant introductions in a far more effective manner than at present, where the first knowledge or information may come after the contaminants have already entered or even passed through the system. For WWTP entities that operate reclamation facilities downstream of the WWTP, this advance knowledge is even more valuable as it allows the reclamation facility to modify its operations as necessary to prevent damage to the process facilities. Even more important, it provides the WWTP the ability to modify its operations to prevent the introduction of dangerous, poisonous or unhealthful contaminants into the drinking water systems.

The prior art does not address the need to monitor and analyze the combined effluent of water treatment plants discharging into a common water collection system which feed into a common WWTP. Kodudula et al., U.S. Pat. No. 6,845,336, disclose a computer system linked by the Internet to various remote waste water treatment facilities which receives real-time data from the facilities. However, in the Kodukula et al. system data is transmitted from discrete, independent treatment site locations for individual analysis. Kodukula et al. does not contemplate the requirements of a WWTP processing water from a central water collection system receiving effluent simultaneously from a number of water treatments sites which are throughout the collection system. There remains a need for a system designed for WWTPs which can collect and interpret data from a number of water treatments sites as an aggregate system.

Typically industrial waste treatment systems, for example heavy metal precipitation or recovery systems often found at circuit board manufacturers, are equipped with basic instrumentation allowing the local operators to monitor the performance of the systems. In some cases, visual or audible alarms are provided, or alarm devices known as autodialers can send alarm messages to various destinations. The Sensaphone 2000, as sold by Sensaphone Inc., is an example of a device which can connect to instruments or switches and send alarms in response to various readings. While these types of devices often have a data logging function built in, they in general do not send raw information without being polled for the information and do not have any control capability.

At more sophisticated installations, the industrial waste water treatment system may be monitored and controlled by an existing in-house Supervisory Control and Data Acquisition System (SCADA). At still other installations, control of the waste water treatment system may be effected by Progammable Logic Controllers (PLC) with a standalone user interface. Both PLC and SCADA systems generally have communication systems which allow them to either send data to other systems or computers, automatically or when requested. Furthermore, many PLC and SCADA systems also have provision for remote control and access operations, allowing outside users to connect via a variety of protocols such as TCP/IP (Internet) or dial-up access. Normally such remote access is reserved for the authorized employees and operators of the industrial process being monitored and controlled.

One particular area in which the present invention provides a substantial improvement over prior art systems is the area of operational security for the process being monitored. Consider the example of an industrial facility with an important industrial waste water treatment system on site tied into the facility's primary SCADA system. If the industrial facility was asked by the municipal WWVTP to allow the municipal WWTP operators to access the SCADA system at the facility to monitor the waste water treatment system at the site, the industrial facility would potentially be opening its entire SCADA system to operators over which it has no control. In more traditional monitoring methods, it is often necessary for an outside entity (the WWTP operators in case) to have connections to the electronic control system and instruments controlling the wastewater treatment process at the industrial facility. Facility owners naturally are reluctant to allow such connections since these connections provide a potential intrusion into the control system. The present invention eliminates these potential intrusions since all data analysis and remote access to the industrial system's operating information is via an external database physically remote and not connected to the process facility being monitored. Thus the industrial facility, using the methods described in the present invention, could safely honor the municipality's request.

It is a further advantage of this invention that multiple industrial waste treatment plants can be simultaneously monitored by the WWTP operators receiving the waste discharge from the industrial waste treatment plants.

Yet another advantage of the present invention is that it allows sophisticated analytical programs to be applied to the data collected from the remote systems without impacting the processing power of the local control systems or requiring each individual industrial waste water treatment plant to add any special software routines to the existing SCADA or PLC programs. With data available from the majority of the industrial waste water treatment plants in an area discharging into a common WWTP, the WWTP has the possibility to analyze the incoming streams and predict conditions at the WWTP well in advance of actual impact.

SUMMARY OF THE INVENTION

The present invention is a system and method for passively monitoring water condition data at waste water treatment sites. For purposes of this disclosure water condition data will be understood to include the composition, quantity, flow rate, and type of wastes included in discharge streams from waste water treatment sites, illustrated by, but not limited to, industrial waste treatment facilities. Information from these facilities, which discharge to a common collection system for eventual processing at a central treatment waste water treatment plant, is transmitted to a remote database, and then accessing and analyzing of that information enables the preparation of reports of particular interest to the receiving WWTP or industrial treatment facility. As will be appreciated by those skilled in the art, the present invention can be realized in any of a number of different configurations.

The components of the present invention consist of a data collection and sending unit, a remote Internet Server computer with a database capable of receiving and storing the collected information, and a web server and reporting unit to analyze the data, forecast present and future treatment requirements, prepare reports, and send out alarms. As will be readily apparent to one skilled in the art, there are many variations of this basic approach, all of which provide a common result.

It is a further intention of this invention to correlate the incoming data from said industrial waste water treatment plants with known flows and compositions at said central WWTP. Thus, for example, it may be known that the transit time for waste water from industrial treatment facility A (xxx) to the WWTP is 3.5 hours, while from facility B (yyy) it is 12 hours. Thus it is a simple calculation to predict the mixed concentration from A and B upon arrival at the WWTP.

At remote facilities generating waste water which discharges into a common collection system, it may also be necessary or desirable to install instrumentation to monitor parameters of interest to the central WWTP. Thus, it is a further objective of the invention to provide a system and method for monitoring water quality entering a waste water collection system at end user locations discharging industrial waste water by installing sensor assemblies at the end user sites and using existing communication infrastructure present at the end user locations to transmit data to a central location via the Internet.

It is another objective to provide a system and method for monitoring water quality in a waste water collection system utilizing sensor assemblies having an integral processing means and a communications interface which allow the sensor assembly to be coupled directly to an Internet server.

It is still another objective to provide a method and system for securing the central WWTP against possible overload by using data manipulation steps to continuously compare the current waste water treatment data from a plurality of sites with current data obtained from the collection system to each other and to historical records of performance already stored in the database. As will be readily appreciated by those skilled in the art of data analysis, this can provide a powerful indicator of either normal conditions expected at the WWTP or out of bounds conditions that may require immediate notification of responsible parties.

It is a further objective of the invention to provide a facile means to evaluate the conditions in the waste water treatment and collection systems as to health and safety concerns and allow this information to be shared by responsible parties via the World Wide Web.

Another objective of the instant invention is to provide a method of monitoring waste water treatment systems by compiling information from one or more sensor assemblies which are in direct communication with a server computer to generate operational information in near real time, if desired, which can be obtained from any location having access to the Internet. The compiled information can also be accessed by regulatory or law enforcement agencies.

Another objective of the instant invention is to provide a system that operates independent of the remote waste water treatment systems wherein no feedback is possible to any monitoring or control system and to transfer such information by a local Internet provider or other internet connection to a consolidating Internet address.

Yet another objective of the instant invention is to provide an Internet report system that can be viewed online or offline providing alarms by the use of current and historical records.

Still another objective of the instant invention is to provide automatic real-time transmission of sensor data, data to graph conversion, data to statistical report conversation, compliance calendars, e-mail notification of compliance and the ability to automatically file data and reports with a regulatory or law enforcement agency.

Still another objective of the instant invention is to provide a method of monitoring a waste water treatment and collection system which is independent and/or complementary of the existing monitoring system. This can be effected by installing at least one sensor assembly independent of the existing monitoring system, such sensor assembly having a communications interface enabling it to transmit information in real time or near real time to a local or remote computer system.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

Figure 1:
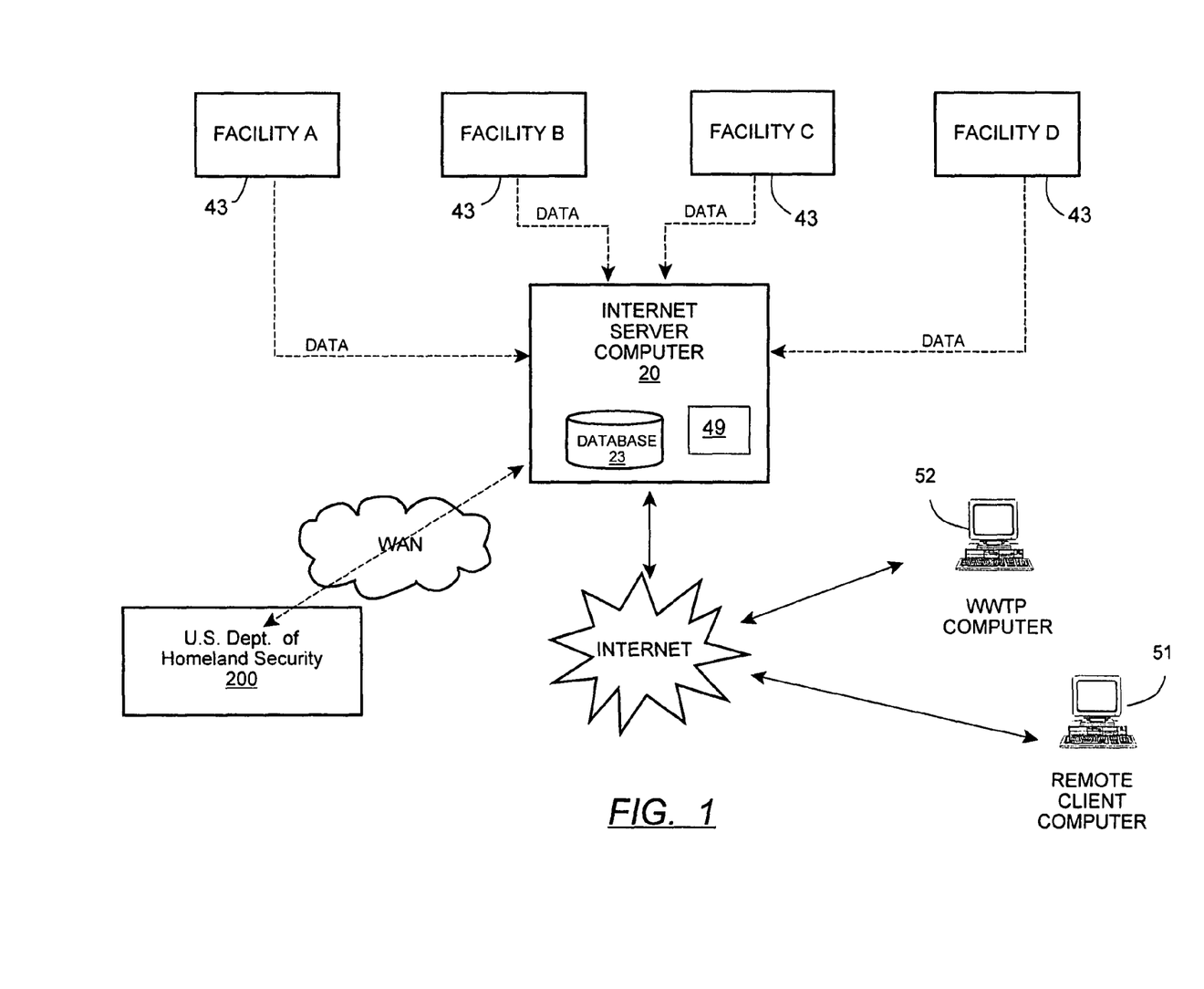
FIG. 1 is a diagram of a waste water collection system having a central waste water treatment plant.
Figure 2:
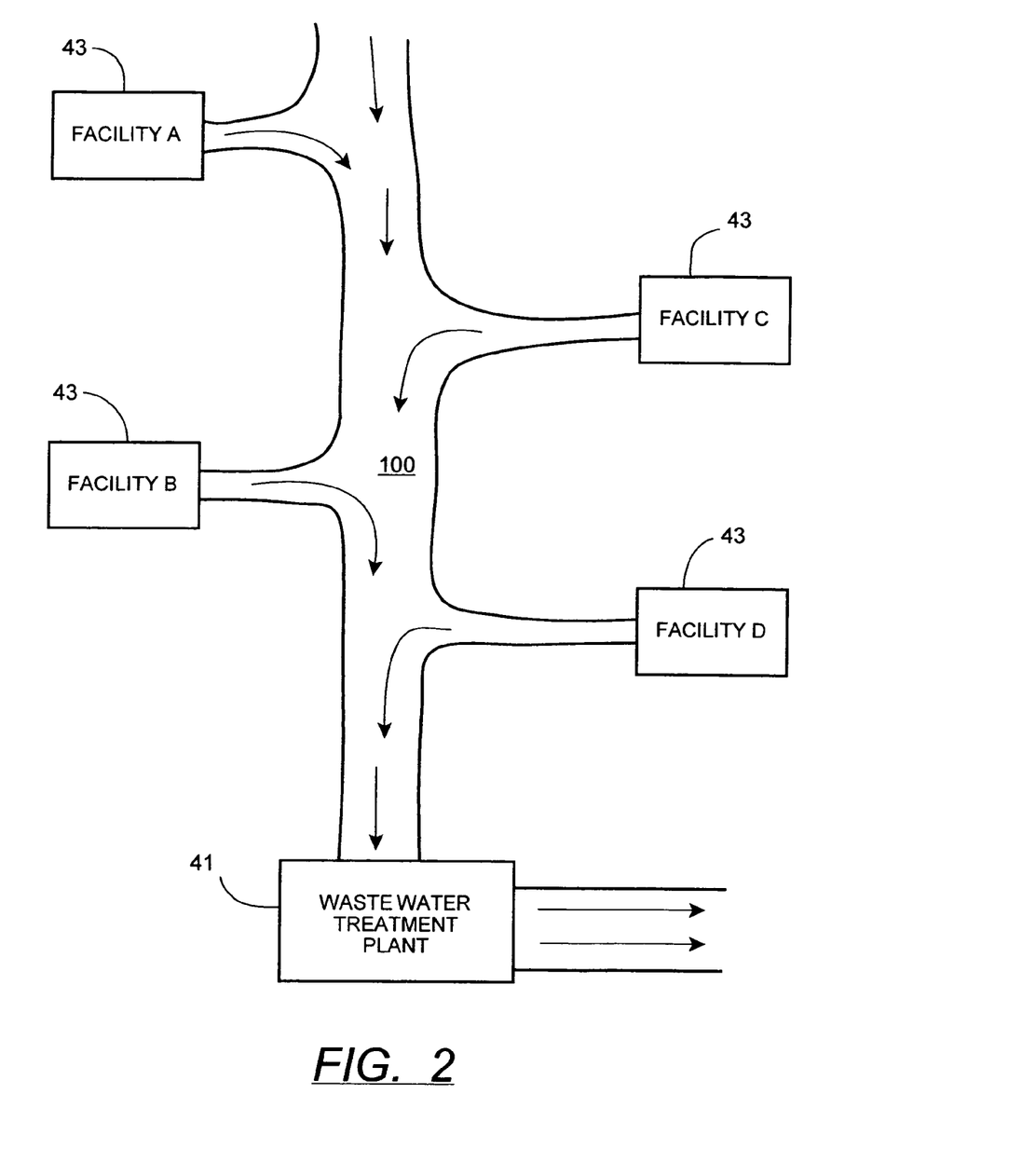
FIG. 2 illustrates an exemplary network configuration of the system of the instant invention.

FIG. 1 illustrates an exemplary network configuration of the system of the instant invention according to a preferred embodiment, with the treatment facilities 43 depicted therein being associated with a central water collection system. FIG. 2 illustrates a typical waste water collection system 100 as is part of the waste water utility infrastructure. The collection system 100 serves numerous end user waste water treatment sites 43 having a central waste water treatment plant (WWTP) 41. In practice, the water treatment sites 43 can include cities, manufacturers, agricultural operations, etc. which treat waste water before it is discharged into the common water system 100.

For a WWTP operator, an accurate prediction of the composition of incoming waste water would be highly beneficial for the efficiency operation of the facility. The present invention includes a method for estimating the composition of influx water in a WWTP serving a geographically distributed waste water collection system In the practice of the invention, the water flow patterns within the waste water collection system from the various treatment sites to the WWTP are known and quantified. Since transit times for water to flow from each of the treatment sites 43 to the WWTP 41 are known, the composition of influx water arriving at the WWTP 41 can be calculated based on transit times and the composition of water leaving each treatment site 43.

In the present invention, monitoring systems are installed at individual waste water treatment sites, these systems typically associated with industrial wastes. The monitoring systems may utilize existing instrumentation and control systems as well as existing communication devices. The monitoring systems store raw data locally for a period of time ranging from seconds to minutes. The raw data is periodically sent to a remotely located Internet Server Computer, as shown in FIG. 1. The remotely located Internet server computer 20 is configured to receive data transmissions from the treatment sites 43 and store the data in a database 23. The database 23 can be the same as the computer 20 or a separate unit coupled to the computer 20. Any suitable data transmission means can be used to transfer data from the facilities 43 to the database 23. In the preferred embodiment, the Internet server computer 20 receives data transmissions through an Internet connection, which can be accomplished using a dedicated PSTN data transmission line, a wireless network connection, a cable Internet connection, or any suitable means which permits continuous data transfer to an Internet server. The environment of the invention is described in terms of the World Wide Web (or Internet), however it will be appreciated that the method of the invention can be implemented using an intranet or WAN arrangement.

Each treatment site 43 includes a means to monitor water quality and water flow rate on-site and transmit raw sensor data to the Internet server computer. The sensor data is time-stamped and includes location specific information on the flow rate and composition of the discharge. A unique identifier is assigned to each of said industrial waste water treatment facilities 43, transmitted concurrently with the output data so that the source of the output data and the physical location of the sending unit is known. As will readily be appreciated, an identifier may also be assigned to each data item. As an alternative to a unique identifier by item, the collected items may be sent in a particular order. The data and unique identifier are then store in the database 23 where it can be asynchronously accessed.

Data stored on the Internet Server Computer 20 can be analyzed to create a variety of reports and events. The data arrives from a sensor assembly or electronic control system and is subsequently processed by sub-programs on the Internet server computer 20. As can be easily appreciated, the Internet server computer 20 may be in actuality a plurality of separate computers or processors designed to spread the processing load as needed. The ID of the sensor assembly is validated and if validated the data is stored in the database. Appropriate unit transformations or scaling parameters may be added from information retrieved in a configuration file or stored in the database. If the sensor ID is not validated, a message is written to a log file which may also be part of the database or a separate file.

In a preferred embodiment, data arriving at the Internet Server Computer 20 is used to produce a report predicting the future composition and flow rate at the central WWTP which is derived from the combined flows from the individual waste water treatment systems 43. This may be accomplished in a simple manner by using the known transit time for a discharger from each individual waste water treatment plant to reach the central treatment plant. The same report may also be computed with much greater confidence and accuracy by comparing historical records with current situations.

In accordance with the method of the invention, the existing communication infrastructure at each of the individual waste water treatment sites is utilized to the greatest extent possible to reduce costs and installation efforts. Such sites each include a communication means installed therein which is connectable to the Internet for data transfer. The communication means can be a standard Public Switched Telephone Network (PSTN), a wireless network connection, a cable Internet connection, or any suitable means which permits continuous data transfer to an Internet server. In a preferred embodiment utilizing sensor assemblies installed at each site, the sensor assemblies can be coupled to existing telephone network wiring so that no major modifications to the end user site are required.

The collected data may be further analyzed to generate Alarm Event reports. These reports compare actual operating information at each of the individual treatment plants with known discharge parameters and limitations, which if exceeded require or indicate the need for a report. The Alarm Event report is automatically transmitted to pre-selected recipients. The preselected recipients can include specific individuals, such as the owners and operators of the individual waste water treatment plants, waste water utility personnel, and specific entities, such as the U.S. EPA, law enforcement agencies and the U.S. Department of Homeland Security. The Alarm Event report can be transmitted via any suitable expedient means of communication, including electronic transmission methods such as .ftp (file transfer protocol), e-mail (smtp), wireless communications devices, or public switched telephone network (e.g. via telefax). If transmitted to a personal communication device, the Alarm Event report can be in the form of a general alarm which requires the recipient to access the web site for detailed information.

Referring again to FIG. 1, the Internet server computer 20 can be directly coupled over a wide area network to a computer network associated with a separate entity such as the Department of Homeland Security 200. In this way, the Alarm Event reports are concurrently received by the Department of Homeland Security.

The simplest and a preferred configuration is achieved by installation of a software program onto the computer system running the industrial waste treatment facility's SCADA system. This program collects individual item or tag information from the SCADA system and periodically sends that data to the remote Internet Server computer and database via transmission and communications methods such as ftp, email, Short Message System (SMS), modem, ADO, XML, and other means known to those skilled in the art. The data may be encrypted for additional security. The data sending unit must transmit sufficient unique information, such as a user ID, to allow the database to decode and properly store the information. The database is operable to decode the information and store it in the proper format within the database. The reporting unit, at its simplest, is a web server program which converts the data into a report for display on any web browser. In a similar configuration, a local computer may be used to communicate with the SCADA system or PLC comprising the electronic control system of the industrial waste water treatment plant, using the local computer to facilitate the transmission of data to the remote Internet Server computer database.

In another embodiment of the present invention, where it is the case that the industrial waste water treatment system is controlled by an electronic control system such as a PLC, a section of ladder logic or function block program code may be inserted into the PLC code base which directs the PLC to send specified data to the remote database. The communications protocol may be any protocol supported by the PLC which facilitates the conversation. For example, RSLinx, a software program from Rockwell Software, may be operative on the remote database computer to facilitate the transfer. Alternatively, any number of commercial commnunications drivers may be used such as those produced by commercial providers such as Kepware, Wonderware, and so on. In the case of an electronic control system typified by SCADA or HMI products such as Wonderware, RSView, WinCC, and other similar products, code blocks may be added to the control code to allow the operating program to collect and send data to the Internet Server computer. Thus in this manner the steps of collecting data locally, storing it temporarily, and subsequently sending this data to a remote Internet Server computer is incorporated into the electronic control system of the facility itself.

The sensors at the treatment facilities 43 can be of the type which are fitted with communications processors which enable the sensors to send data directly to the remote Internet server computer 20. Suitable instruments would include sensor assemblies having micro-sensors that incorporate chemically selective sensors and physical measurement devices on a single chip of silicon or other functional material that can chemically profile a sample as small as a drop. The sensor assemblies include a communications interface effective for real time data transmission, such as a Lonworks® network variable interface. Suitable sensors would include the Six-CENSE™ and CT-CENSE™ manufactured by Dascore, Inc., as well as the multi-sensor devices manufactured by Sensicore, Inc. In this arrangement, sensor assemblies at a treatment site can be coupled to the Internet server computer 45 through existing telephone wiring on a dedicated network connection. Alternatively, sensor assemblies can be coupled to a local computer in communication with the Internet server computer 20 with data transmission from the sensor assemblies emanating from the local computer.

The transmitted data is stored on the Internet server computer where it can be asynchronously accessed. This storage may take many forms such as flat files, spreadsheets, and relational or non-relational databases. The preferred embodiment employs a relational database such as Microsoft SQL Server or Oracle database products.

When data arrives at the remote Internet server computer 20, the data is decoded and placed in the appropriate locations. Secondary programs 49 can be executed against this data to calculate any manner of statistical inferences or derived data. The secondary programs 49 include a means to analyze the location-specific flow rate data and composition data transmitted from the treatment sites data based on known water flow patterns in order to calculate a predicted composition and flow rate of the water arriving at the WWTP as a function of time.

These secondary programs can directly send email or text pages or voice messages or other alerts to a variety of personal communications equipment such as cell phones, pagers, Blackberrys and Palm devices.

The output data received is manipulated into an analysis result and a report result and uploaded to an Internet web server in a format suitable for access and visualization with a web browser computer program. The data may thus be viewed at any remotely located client computer 51 having proper authority to access the data. In the practice of the invention, the data can be viewed using a web browser on a computer 52 located at the WWTP. The analysis result may take many different forms, however the preferred form for this invention is a prediction of the water composition and flow rate in terms of selected parameters of interest arriving at the WWTP as a function of time. Thus for example, a processor resident on the Internet server, or on a computer which may readily communicate with the Internet server computer, for example on same local area network as the Internet server, is operable to calculate the predicted concentration of various components at the time of their arrival at the central WWTP facility and compare the computed values with pre-established parameters. If such computed values are outside of the pre-established parameters, the Internet server computer, or said other communicating computers, may issue an Alarm Event report or other alerts through well recognized communications means, including email, text to voice telephone messages, pagers, SMS messages, and instant messaging or groupware protocols. The Alarm Event report can be automatically transmitted to pre-selected recipients, including operators and supervisors at said waste water treatment plant receiving the wastes, as well as to designated state, federal and local regulatory officials and entities, such as the U.S. EPA or Department of Homeland Security. The Alarm Event report can be transmitted via file transfer protocol (.ftp), email, a wireless communication device, or any other suitable means of communication.

Figure 3:
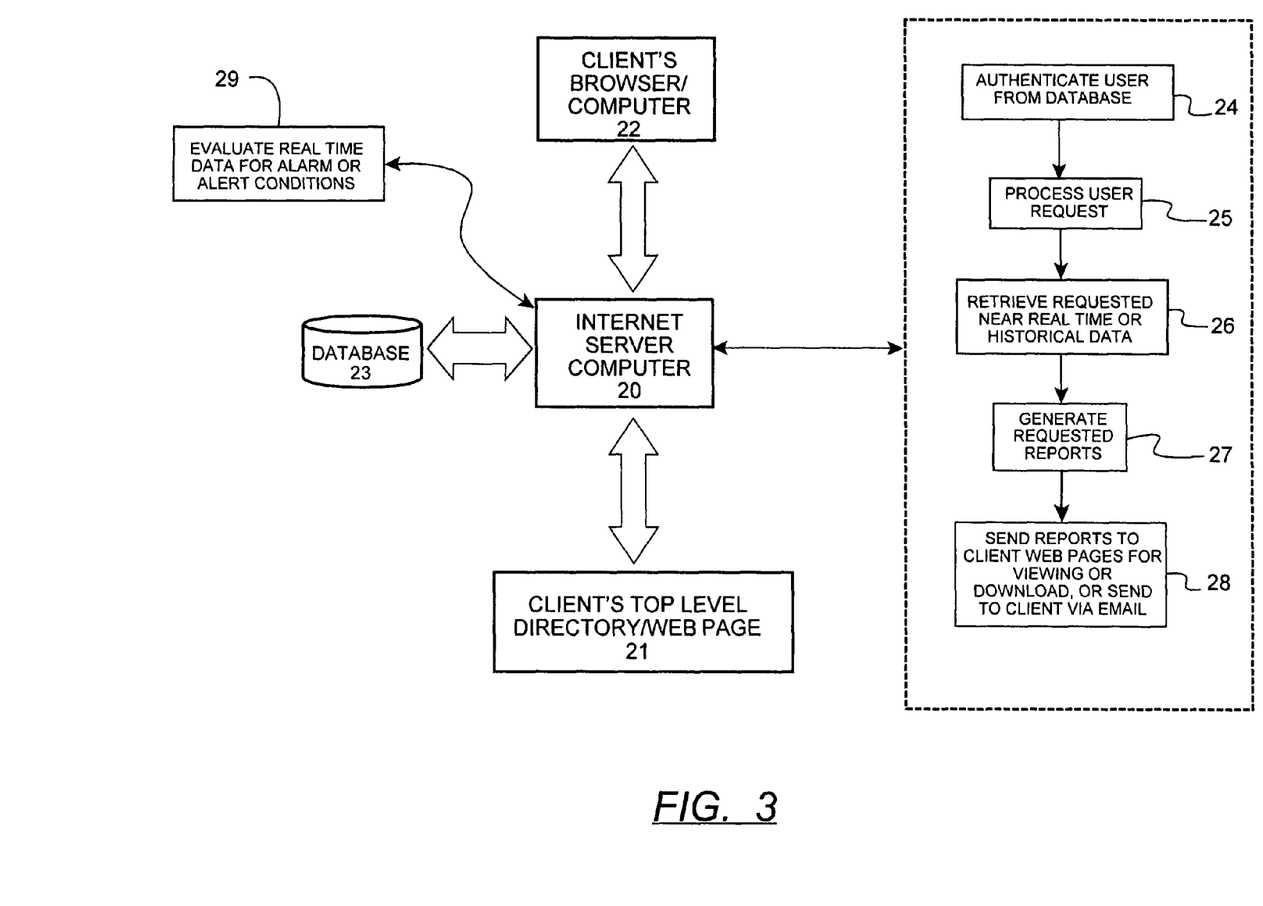
FIG. 3 graphically illustrates the flow of data in the system of the invention.

FIG. 3 graphically illustrates the flow of data. System operation is monitored in near real time by accessing an Internet web site 21. Data transmitted by the sensor assemblies is collected on the Internet server computer 20 and stored in the database computer 23, which may be one and the same as the Internet server computer or a separate computer networked to the Internet server computer 20. As will be readily appreciated by those skilled in the art, the number and location of the Internet server computer(s) 20 and the database 23 may be varied to suit the network traffic or demands of a particular client. The data collected on the Internet server computer 20 is also manipulated by the Internet server computer 20 wherein operating parameters are displayed graphically in a tabular format which may be color coded to provide an indication of normal operation, warning status or alarm conditions. The information from the sensors is used for determining critical information for the proper evaluation of the waste water treatment system which is normalized and graphically displayed for performance evaluation, preventative maintenance, scheduling, or for trouble shooting.

When the client accesses the web site through a user request 25, the client's credentials are compared 24 to the credentials stored in the database. If authenticated, the client may then access near real time or historical performance data which 26 can be displayed or plotted and presented also in geographical or tabular form reports 27 for selected periods. The requested reports and displays are then placed into the client's web pages for display on the client's browser 22. In the event of a contamination event, the client can access a complete report situation triggering the Alarm Event. The report can include a geographic representation of the source of the contaminant in the system based on sensor data and the projected flow through the system. In this way, rapid containment of the contaminant can be achieved.

The remote Internet computer 20 can receive data for a plurality of WWTPs having associated waste water treatment systems, and data for a specific WWTP can be remotely accessed from a remote computer via a global computer network. The data and associated analysis reports for specific WWTPs can be segregated with restricted permission access requirements. In the preferred embodiment, specific WWTP data on the Internet computer is accessed from a remote computer by entry of account logon data specific to a user and the WWTP.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

I claim:

1. A system for predicting water characteristics at a water facility, the water facility being located geographically downstream from a water monitoring location, the water flowing between the water monitoring location and the water facility, the system comprising:
   a sensor assembly disposed at the water monitoring location and configured to generate sensor data relating to a flow rate and a composition of the water present at the water monitoring location;
   transmission means configured to transmit the sensor data from the sensor assembly to an analyzing unit,
   the analyzing unit being configured to analyze the sensor data and determine therefrom the flow rate and the composition of the water present at the water monitoring location; and
   an Internet server computer configured to receive the analyzed sensor data from the analyzing unit,
   the Internet server computer including a processor and a software program stored in a memory of the Internet server computer, the Internet server computer further including a plurality of instruction interpretable by the processor such that the software program causes the Internet server computer to:
   receive the analyzed sensor data from the analyzing unit; and
   predict the composition and the flow rate of the water present at the water facility based on the composition and flow rate of the water at the water monitoring location and based on a known flow pattern of the water between said water monitoring location and said water facility, the known flow pattern being stored in the memory of the Internet server computer,
   wherein said analyzing unit is in communication with or is integral with said Internet server computer.

2. The system of claim 1, wherein said system comprises an electronic control system disposed at said water monitoring location, and wherein said electronic control system is in communication with said sensor assembly.

3. The system of claim 2, wherein the transmission means is integral with said electronic control system.

4. The system of claim 2, wherein the transmission means comprises at least one local computer located at said water monitoring location at which the sensor assembly is located, coupled to said electronic control system, and configured to transmit data via Internet technology.

5. The system of claim 2, wherein said electronic control system comprises a Supervisory Control and Data Acquisition System (SCADA).

6. The system of claim 2, wherein said electronic control system comprises a Programmable Logic Controller (PLC).

7. The system of claim 1, wherein said sensor assembly includes means for time stamping and adding location specific information to said sensor data.

8. The system of claim 1, wherein said sensor assembly includes means for adding a unique identifier to said sensor data, wherein the unique identifier identifies the water monitoring location at which the sensor assembly is located.

9. The system of claim 1, further comprising at least one software-implemented database in communication with said sensor assembly and wherein said sensor data is stored on said at least one software-implemented database.

10. The system of claim 9, wherein said at least one software-implemented database is configured to communicate with said Internet server computer.

11. The system of claim 9, wherein said at least one software-implemented database is resident on said Internet server computer.

12. The system of claim 9, further comprising a computer in communication with said at least one software implemented database,
wherein the at least one software implemented database is configured to communicate with the computer so that said sensor data stored on said at least one software-implemented database is accessible from said computer.

13. The system of claim 1, wherein said analyzing unit is further configured to predict a composition and flow rate of water arriving at the water facility as a function of time.

14. The system of claim 1, wherein said analyzing unit is integral with said Internet server computer.

15. The system of claim 1, wherein said
analyzing unit is further configured to manipulate said sensor data and/or analyzed data into an analysis result and/or a report result; and
a communication means configured to access
said analysis result and/or said report result from said Internet server computer.

16. The system of claim 15, wherein said manipulating means is configured to communicate with said Internet server computer.

17. The system of claim 15, wherein said manipulating means is resident on said Internet server computer.

18. The system of claim 15, wherein said communication means is configured to communicate said analysis result and/or said report result directly to pre-selected recipients.

19. The system of claim 18, wherein said communication means comprises means for transmitting said analysis result and/or said report result via e-mail.

20. The system of claim 18, wherein said communication means comprises means for transmitting said analysis result and/or said report result via file transfer protocol (ftp).

21. The system of claim 18, wherein said communication means comprises means for transmitting said analysis result and/or said report result via the Internet.

22. The system of claim 1, wherein the transmission means comprises an Internet connection.

23. The system of claim 1, wherein said transmission means comprises a communications interface integral to said sensor assembly.

24. The system of claim 1, further comprising a computer and a communication means configured to access
said sensor data from the computer.

25. The system of claim 12, wherein said sensor data stored on said at least one software-implemented database is accessible from said computer via Internet technology.

26. The system of claim 1, wherein the transmission means comprises a transmitting computer coupled to said sensor assembly.

27. An apparatus for predicting water characteristics at a water facility geographically downstream of a water monitoring location, the water flowing between the water monitoring location and the water facility, the apparatus comprising:
a sensor assembly disposed at the water monitoring location and configured to generate sensor data relating to flow rate and composition of the water present at the water monitoring location;
transmission means configured to transmit the sensor data from the sensor assembly to an analyzing unit;
the analyzing unit being configured to analyze the sensor data and determine therefrom the flow rate and the composition of the water present at the water monitoring location; and
a computer processing device configured to receive the analyzed sensor data from the analyzing unit,
the computer processing device including a processor and a software program stored in a memory of the computer processing device, the computer processing device further including a plurality of instruction interpretable by the processor such that the software program causes the computer processing device to:
receive the sensor data from the analyzing unit; and
predict a characteristic of the water present at the water facility located downstream of the water monitoring location based on the flow rate and the composition of the water present at the water monitoring location and based on a known flow pattern of the water between the water monitoring location and the water facility, the known flow pattern being stored in the memory of the computer processing device.

28. The apparatus of claim 27, wherein the computer processing device is being further configured to transmit the predicted water characteristic to an internet server computer.

29. The apparatus of claim 27, wherein the water characteristic includes water composition.

30. The apparatus of claim 27, wherein the water characteristic includes flow rate.

31. The apparatus of claim 27, wherein said analyzing unit is in communication with the computer processing device.

32. The apparatus of claim 31, further comprising a communication means,
wherein the analyzing unit is further configured to manipulate said sensor data and/or analyzed data into an analysis result and/or a report result, and
wherein said analysis result and/or said report result is accessible from said internet server computer via the communication means.

33. The apparatus of claim 32, further configured to communicate said analysis result and/or said report result directly to pre-selected recipients using said communication means.

34. The apparatus of claim 33, wherein said communication means comprises means for transmitting said analysis result and/or said report result via e-mail.

35. The apparatus of claim 33, wherein said communication means comprises means for transmitting said analysis result and/or said report result via file transfer protocol (ftp).

36. The system of claim 33, wherein said communication means comprises means for transmitting said analysis result and/or said report result via the Internet.

* * * * *